United States Patent
Maruyama et al.

(10) Patent No.: US 8,339,520 B2
(45) Date of Patent: Dec. 25, 2012

(54) DIGITAL BROADCAST RECEIVER AND METHOD FOR RECEIVING DIGITAL BROADCAST

(75) Inventors: Yutaka Maruyama, Ichikawa (JP); Yoshiyuki Takagi, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 128 days.

(21) Appl. No.: 12/969,000

(22) Filed: Dec. 15, 2010

(65) Prior Publication Data

US 2011/0141377 A1 Jun. 16, 2011

(30) Foreign Application Priority Data

Dec. 15, 2009 (JP) ................. 2009-284172

(51) Int. Cl.
*H04N 5/50* (2006.01)
*H04N 5/268* (2006.01)

(52) U.S. Cl. ...................... 348/732; 348/706

(58) Field of Classification Search ............... 348/725, 348/731–733, 705, 706; 725/131, 139, 151; H04N 5/44, 5/50, 5/268
See application file for complete search history.

(56) References Cited

U.S. PATENT DOCUMENTS

| 5,818,541 | A  | * | 10/1998 | Matsuura et al. | 348/565 |
| 7,929,062 | B2 | * | 4/2011  | Oh              | 348/732 |
| 2003/0030755 | A1 | * | 2/2003  | Ahn          | 348/732 |
| 2004/0194134 | A1 | * | 9/2004  | Gunatilake et al. | 725/38 |

FOREIGN PATENT DOCUMENTS

| JP | 2006-100953 | 4/2006 |
| JP | 2007-67588  | 3/2007 |
| JP | 2009-188492 | 8/2009 |

OTHER PUBLICATIONS

Japanese Office Action issued Dec. 6, 2011, in Patent Application No. 2009-284172 (with English-language translation).

* cited by examiner

*Primary Examiner* — Sherrie Hsia
(74) *Attorney, Agent, or Firm* — Oblon, Spivak, McClelland, Maier & Neustadt, L.L.P.

(57) ABSTRACT

The digital broadcast receiver 10 includes the first tuner 106 and the second tuner 107. The first tuner 106 receives a certain channel, whereas the second tuner 107 performs channel detection at a predetermined cycle. If the reception level of the certain channel currently received by the first tuner 106 becomes lower than a threshold, the digital broadcast receiver 10 switches the channel received by the first tuner 106 to a channel whose reception level is equal to or higher than the threshold among channels detected by the second tuner 107.

12 Claims, 5 Drawing Sheets

| CHANNEL NUMBER | BROADCAST STATION NAME AAA TELEVISION | RECEPTION LEVEL a[dB] |
|---|---|---|

FIG.3

| CHANNEL NUMBER 041 | BROADCAST STATION NAME BBB BROADCAST | RECEPTION LEVEL b [dB] | DETECTED TIME XX:XX:XX |
|---|---|---|---|
| CHANNEL NUMBER 051 | BROADCAST STATION NAME CCC TELEVISION | RECEPTION LEVEL c [dB] | DETECTED TIME YY:YY:YY |
| CHANNEL NUMBER 081 | BROADCAST STATION NAME TELEVISION DDD | RECEPTION LEVEL d [dB] | DETECTED TIME ZZ:ZZ:ZZ |
| ⋮ | ⋮ | ⋮ | ⋮ |

FIG. 4

| SWITCHING-SOURCE BROADCAST STATION NAME | BROADCAST STATION NAME AAA TELEVISION |
|---|---|
| SWITCHING-TARGET BROADCAST STATION NAME | BROADCAST STATION NAME EEE BROADCAST |
| | BROADCAST STATION NAME TELEVISION DDD |
| | BROADCAST STATION NAME CCC TELEVISION |
| | ⋮ |

FIG. 5

| SWITCHING-SOURCE BROADCAST STATION NAME | BROADCAST STATION NAME AAA TELEVISION |
|---|---|
| SWITCHING-TARGET BROADCAST STATION NAME | BROADCAST STATION NAME TELEVISION DDD |
| | BROADCAST STATION NAME GGG BROADCAST |
| | BROADCAST STATION NAME FFF TELEVISION |
| | ⋮ |

| | |
|---|---|
| 051 | BROADCAST STATION NAME TELEVISION DDD |
| 081 | BROADCAST STATION NAME CCC TELEVISION |
| ⋮ | ⋮ |

DIGITAL BROADCAST RECEIVER AND METHOD FOR RECEIVING DIGITAL BROADCAST

CROSS REFERENCE TO RELATED APPLICATION

The entire content of Japanese Patent Application No. 2009-284172 (filed on Dec. 15, 2009) is incorporated herein by reference.

BACKGROUND OF THE INVENTION

1. Field of the Invention

The present invention relates to a digital broadcast receiver configured to receive digital broadcast, and a method for receiving digital broadcast using the digital broadcast receiver.

2. Description of the Related Art

Heretofore, mobile digital broadcast receivers having a function to receive digital terrestrial broadcast, such as cellular phones and car navigation systems, have been in widespread use. In general, receivable channels are different from one area to another. For this reason, the mobile digital broadcast receiver may become unable to receive a currently receiving channel along with its movement.

To cope with the above problem, a technique is described in Japanese Patent Application Publication No. 2006-100953, for example. A digital broadcast receiver of this technique includes a memory which stores therein station selection key numbers and multiple broadcast stations associated with each of the station selection keys. A controller performs receivabillty judgment and then rewrites the memory so that broadcast stations receivable in the judged area may be each associated with the corresponding station selection key with which broadcast stations in the same group are associated. Every time any of the station selection keys is pressed, the controller switches the broadcast station and service among the multiple broadcast stations and multiple services on the basis of information in the memory.

The conventional digital broadcast receiver described above, however, first detects receivable broadcast stations (i.e., channel scanning) and then associates the detected broadcast stations with station selection keys. Due to this configuration, the digital broadcast receiver cannot switch the channel and restart reception in area change until channel scanning is completed. Since the channel scanning requires certain amount of time, the broadcast is disconnected during this period. This is inconvenient for the user who would like uninterrupted viewing.

The present invention therefore has an object to provide a digital broadcast receiver and a method for receiving digital broadcast which allow broadcast reception to be restarted instantly when the digital broadcast receiver moves and the area changes.

SUMMARY OF THE INVENTION

In order to solve the above problem, the present invention has the following aspects. First of all, a first aspect of the present invention is a digital broadcast receiver (digital broadcast receiver 10) configured to receive digital broadcast, the digital broadcast receiver includes: a first tuner (first tuner 106) configured to receive a certain channel; a second tuner (second tuner 107) configured to perform channel detection at a predetermined cycle; and a switch unit (switch unit 121) configured to switch a channel received by the first tuner to a channel whose reception level is not lower than a threshold among channels detected by the second tuner, when a reception level of the certain channel received by the first tuner becomes lower than the threshold.

In the digital broadcast receiver described above, of the first and second tuners, the first tuner receives a certain channel and the second tuner performs channel detection at a predetermined cycle. When the reception level of the certain channel received by the first tuner is reduced, the digital broadcast receiver switches a channel received by the first tuner to a channel whose reception level is high among channels detected by the second tuner. Thus, the digital broadcast receiver is capable of performing the reception of a certain channel and the channel detection in parallel by use of the two tuners, and thereby allowing broadcast reception to be restarted instantly when the area changes.

A second aspect of the present invention is that the second tuner performs the channel detection at the predetermined cycle.

A third aspect of the present invention is that the digital broadcast receiver includes a first storage (ROM114) configured to hold, on the certain channel basis, a priority list of a switching-target-candidate channels, wherein the switch unit performs the channel switching on the basis of the priority list.

A fourth aspect of the present invention is that the digital broadcast receiver includes a second storage (ROM114) configured to hold a list of broadcast stations constituting a group, wherein the switch unit performs the channel switching on the basis of the list of broadcast stations constituting a group.

A fifth aspect of the present invention is that the digital broadcast receiver includes a presentation unit (montor117) configured to present information on switching-target-candidate channels, wherein when any of the switching-target-candidate channels is selected, the switch unit switches the channel to the selected channel.

A sixth aspect of the present invention is that the digital broadcast receiver includes a third storage (memory112) configured to hold detected channel information indicating the channels detected by the second tuner.

A seventh aspect of the present invention is that the digital broadcast receiver includes an update unit (controler102) configured to update the detected channel information so that the third storage stores sets of detected channel information which are respectively obtained through the last predetermined times of the channel detection by the second tuner.

A eighth aspect of the present invention is that when performing the channel switching on the basis of the priority list of a switching-target-candidate channels, the switch unit forms the priority list on the basis of the detected channel information held by the third storage, and performs the channel switching on the basis of the priority list thus formed.

A ninth aspect of the present invention is that the detected channel information includes information on detected time at which the channels are each detected by the second tuner, and the switch unit forms the priority list so that a channel the detected time of which is newer has higher priority.

A tenth aspect of the present invention is that the switch unit forms the priority list so that a channel having been more frequently detected by the second tuner has higher priority.

A eleventh aspect of the present invention is that when performing the channel switching on the basis of the list of broadcast stations constituting a group, the switch unit determines priority of channels of broadcast stations included in the list of broadcast stations constituting a group, and performs the channel switching on the basis of the priority thus determined.

A twelfth aspect of the present invention is that the detected channel information includes reception levels of digital broadcast signals of the channels detected by the second tuner, and the switch unit determines the priority of channels so that a channel with the reception level not lower than a predetermined value has higher priority among the channels of the broadcast stations included in the list of broadcast stations constituting a group.

A thirteenth aspect of the present invention is that a method for receiving digital broadcast using a digital broadcast receiver which has a first tuner and a second tuner and is configured to receive digital broadcast, comprising the steps of: causing the first tuner to receive a certain channel; causing the second tuner to perform channel detection; and causing the digital broadcast receiver to switch a channel received by the first tuner to a channel whose reception level is not lower than a threshold among channels detected by the second tuner, when a reception level of the certain channel received by the first tuner becomes lower than the threshold.

The present invention allows broadcast reception to be restarted instantly when the digital broadcast receiver moves and the area changes.

DESCRIPTION OF THE EMBODIMENTS

Next, an embodiment of the present invention is described with reference to the drawings. Specifically, (1) Configuration of Digital Broadcast Receiver, (2) Operation of Digital Broadcast Receiver, (3) Operations and Effects, and (4) Other Embodiments are described. In the description of the drawings in the embodiment below, the same or similar reference numerals denote the same or similar parts.

(1) Configuration of Digital Broadcast Receiver

Figure 1:
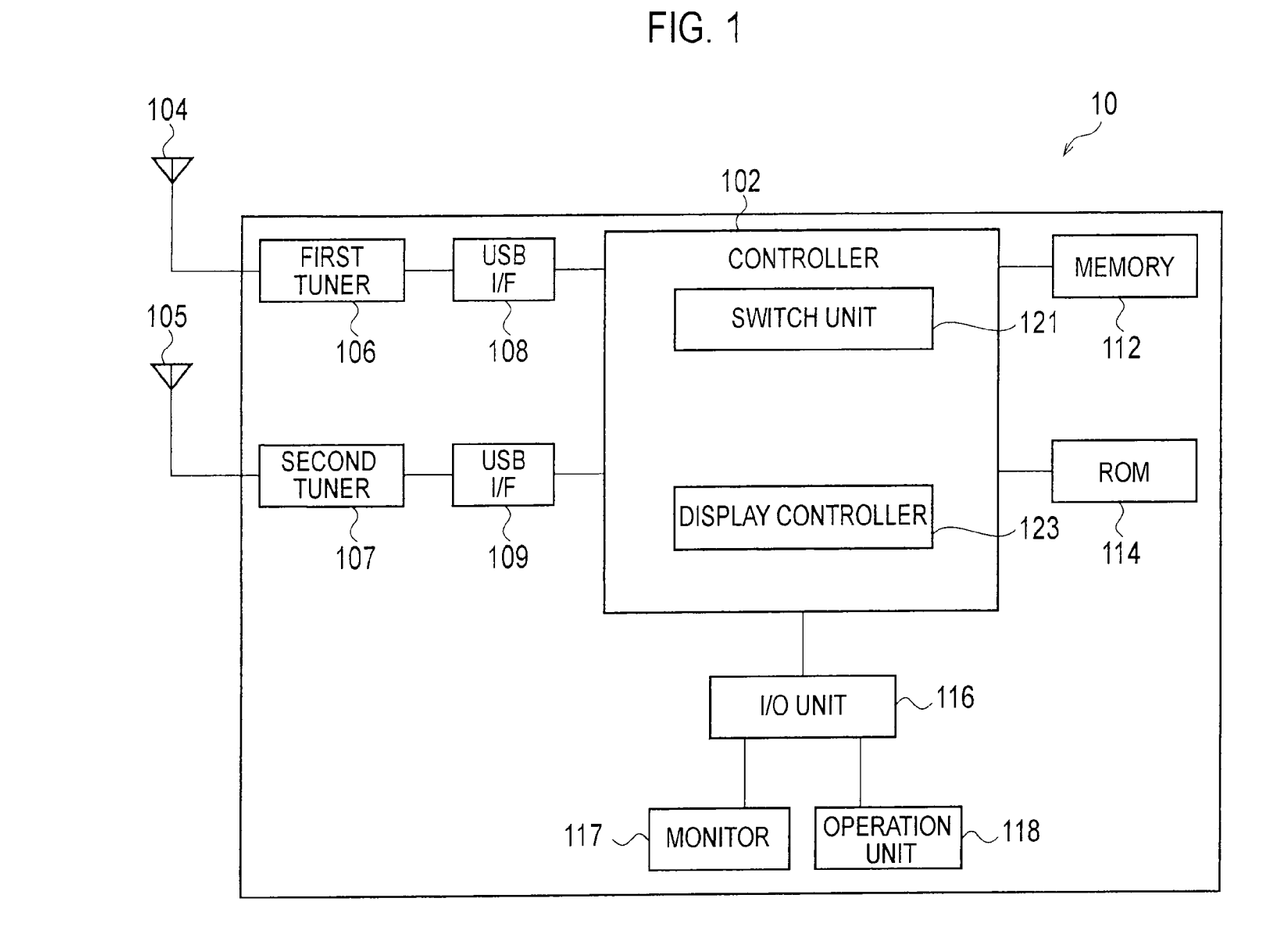
FIG. 1 is a diagram illustrating a configuration of a digital broadcast receiver according to an embodiment of the present invention.

FIG. 1 is a diagram illustrating a configuration of a digital broadcast receiver 10 according to the embodiment of the present invention.

The digital broadcast receiver 10 shown in FIG. 1 is designed to receive digital broadcast. Here, the digital broadcast is not limited to specific digital broadcast, but includes digital terrestrial broadcast, BS digital broadcast, CS digital broadcast, and the like. The digital broadcast receiver 10 includes a controller 102, an antenna 104, an antenna 105, a first tuner 106, a second tuner 107, a Universal Serial Bus (USB) interface (I/F) 108, a USB I/F 109, a memory 112, a ROM 114, an input/output unit (I/O unit) 116, a monitor 117, and an operation unit 118.

The controller 102 is formed of a CPU, for example, and controls various functions that the digital broadcast receiver 10 has. The controller 102 includes a switch unit 121 and a display controller 123.

The antennas 104 and 105 receive digital broadcast signals. The digital broadcast signals include video data, audio data, channel numbers, broadcast station names, program guides, and the like which are encrypted.

The first tuner 106 is connected to the controller 102 via the USB I/F 108. The first tuner 106 picks up the signal of a certain channel included in the digital broadcast signals, and outputs the signal to the controller 102 via the USB I/F 108.

The second tuner 107 is connected to the controller 102 via the USB I/F 109. The second tuner 107 performs channel detection (channel scanning) at a predetermined cycle, and outputs a result of the channel detection to the controller 102 via the USB I/F 109.

The controller 102 performs a decryption process on the signal of the certain channel received from the first tuner 106, and thereby obtains video data and audio data. The video data and audio data thus obtained are outputted to the monitor 117 via the I/O unit 116. The monitor 117 displays thereon video of the received video data, and outputs audio of the received audio data through a built-in speaker (not shown).

The controller 102 also receives the result of the channel detection from the second tuner 107.

The memory 112 is a DDR-SRAM, for example, and stores therein information required for achieving the various functions that the digital broadcast receiver 10 has. The ROM 114 is a flash ROM, for example, and stores therein information such as area setting information, information on channels detected through channel scanning to be described later, and program guide information.

The operation unit 118 generates an operation signal according to an operation made by the user, and outputs the operation signal to the controller 102 via the I/O unit 116.

The digital broadcast receiver 10 according to this embodiment is capable of performing the reception of a certain channel and the channel detection in parallel by use of the first tuner 106 and the second tuner 107, and thereby restarting broadcast reception instantly when the area changes. To be more specific, the digital broadcast receiver 10 performs the following processes.

The first tuner 106 receives the digital broadcast signal of a certain channel. Then, the first tuner 106 measures, at a predetermined cycle, a reception level value of the digital broadcast signal of the certain channel thus received. At every measurement of the reception level value, the first tuner 106 also outputs, to the controller 102, the reception level value thus measured, and the channel number and broadcast station name of the currently-receiving channel.

Figure 2:
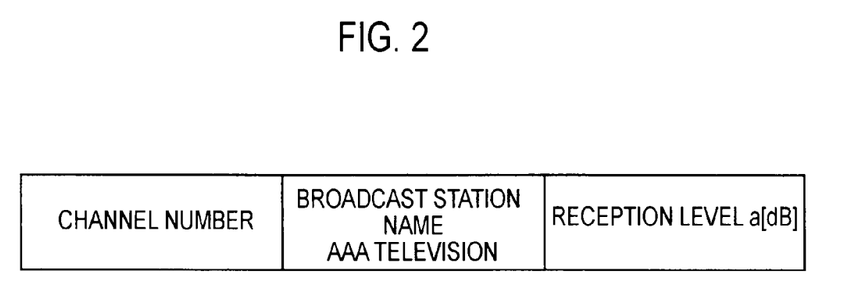
FIG. 2 is a diagram illustrating an example of currently-receiving channel information according to the embodiment of the present invention.

At every reception of the reception level value, and the channel number and broadcast station name of the currently-receiving channel, the controller 102 generates currently-receiving channel information by associating these received values with one another. FIG. 2 is a diagram illustrating an example of the currently-receiving channel information.

The second tuner 107 performs channel scanning at a predetermined cycle in parallel with the reception of digital broadcast on the certain channel by the first tuner 106. Then, at every channel detection through the channel scanning, the second tuner 107 measures a reception level value of the digital broadcast signal of the channel thus detected (detected channel). The second tuner 107 also outputs, to the controller 102, the reception level value thus measured, and the channel number, broadcast station name, and detected time of the detected channel.

Figure 3:
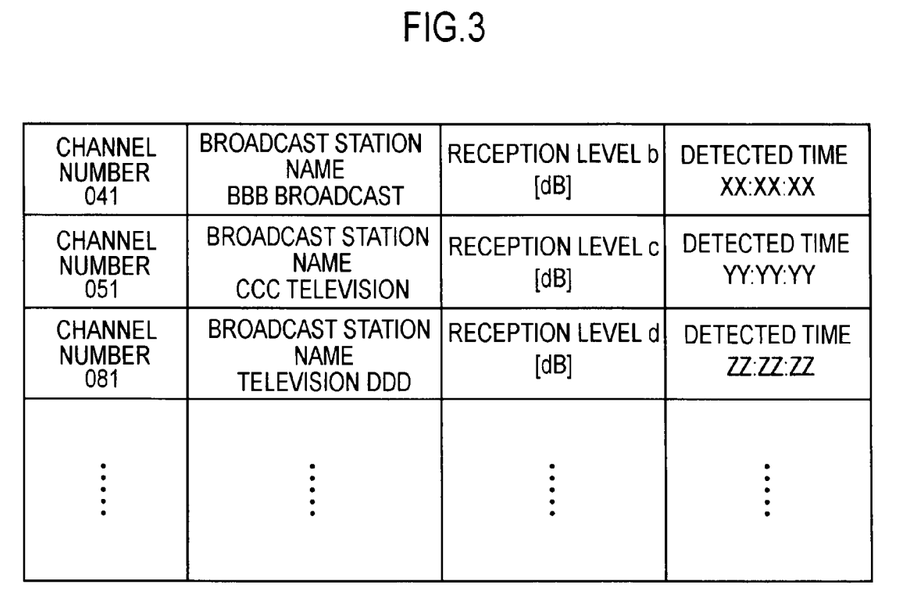
FIG. 3 is a diagram illustrating an example of detected channel information according to the embodiment of the present invention.

At every reception of the reception level value, and the channel number, broadcast station name, and detected time of the detected channel, the controller 102 generates detected channel information by associating these received values with one another. FIG. 3 is a diagram illustrating an example of the detected channel information. The controller 102 also stores the thus-generated detected channel information in the memory 112 as a result of the channel scanning.

Here, the controller 102 performs an update process so that the memory 112 may store certain sets of detected channel information which are respectively obtained through the last predetermined times of channel scanning. To be more specific, if certain sets of detected channel information have been already stored in the memory 112, the controller 112 deletes the oldest set of detected channel information based on the detected time, and stores the latest set of detected channel information thus generated.

Alternatively, if a predetermined time period (e.g., five minutes) has passed from the detected time of a certain set of detected channel information stored in the memory 112, the controller 102 may delete this set of detected channel information from the memory 112.

Note that, the controller 102 may cause the memory 112 not to store a certain set of detected channel information if reception level values of all detected channels included in this set of detected channel information are lower than a threshold or if reception level values of a predetermined rate (e.g., 50% or more) of detected channels included in the set of detected channel information are lower than the threshold.

Figure 4:
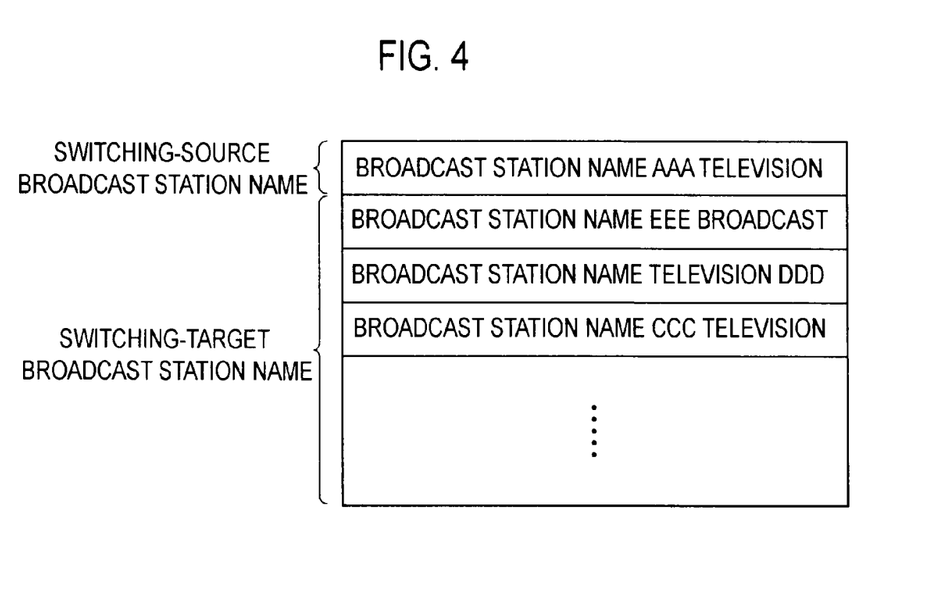
FIG. 4 is a diagram illustrating an example of a priority list according to the embodiment of the present invention.

The ROM 114 stores, on per-channel basis, a priority list indicating priority of switching-target-candidate channels for the channel as a switching source. FIG. 4 is a diagram illustrating an example of the priority list. The priority list shown in FIG. 4 is formed of a broadcast station name of a switching-source channel and broadcast station names of switching-target-candidate channels. The broadcast station names of switching-target-candidate channels are arranged in the order of priority. Here, the priority can be set by the user. The controller 102 generates a priority list according to an operation made by the user through the operation unit 118, and stores the generated priority list in the ROM 114.

Note that, the controller 102 may reflect a result of channel scanning on a priority list on the basis of detected channel information. For example, the controller 102 may form a priority list of channels detected through the last multiple times of channel scanning, so that names of switching-target-candidate broadcast stations corresponding to the more currently detected channels have higher priority. Alternatively, the controller 102 may form a priority list of the channels detected through the last multiple times of channel scanning, so that names of switching-target-candidate broadcast stations corresponding to the more frequently detected channels have higher priority.

Figure 5:
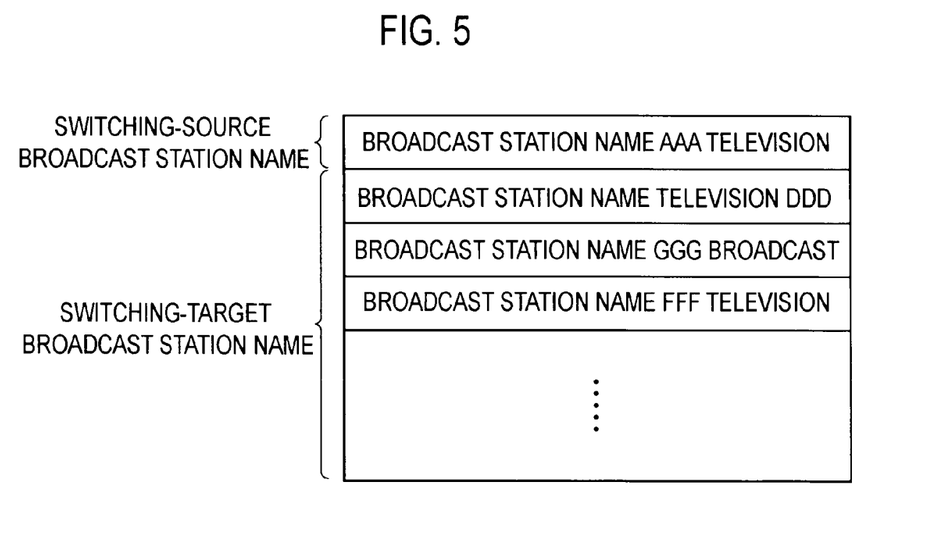
FIG. 5 is a diagram illustrating an example of a group station list according to the embodiment of the present invention.

The ROM 114 also stores therein a list of group stations indicating broadcast stations constituting a group. Here, the group denotes a set of broadcast stations which broadcast the same program in nationwide broadcast. FIG. 5 is a diagram illustrating an example of the group station list. The priority list shown in FIG. 4 is formed of a broadcast station name of a switching-source channel and broadcast station names of switching-target-candidate channels. The broadcast station names of switching-target-candidate channels are the names of broadcast stations which are adjacent to and in the same group as the broadcast station of the switching-source channel.

After currently-receiving channel information and detected channel information are generated, the switch unit 121 of the controller 102 judges whether or not the reception level value of the currently-receiving channel included in the currently-receiving channel information is lower than a threshold. Here, the threshold is a lowest possible reception level value for viewing digital broadcast, and is stored in the memory 112 beforehand.

If the reception level value of the currently-receiving channel is lower than the threshold, the switch unit 121 next judges whether or not the reception level value of any of the detected channels included in the certain sets of detected channel information stored in the memory 112 is equal to or higher than the threshold.

If the reception level value of any of the detected channels is equal to or higher than the threshold, the switch unit 121 judges whether a channel switching mode is a priority mode or a group mode. Here, the user can set the channel switching mode to either the priority mode or the group mode by the operation of the operation unit 118. The switch unit 121 can judge whether the channel switching mode is the priority mode or the group mode on the basis of an operation signal generated according to this operation.

If the channel switching mode is the priority mode, the switch unit 121 specifies a switching-target channel on the basis of the currently-receiving channel information, the detected channel information, and the corresponding priority list.

To be more specific, the switch unit 121 extracts a broadcast station name in the currently-receiving channel information (i.e., the broadcast station name of the currently-receiving channel). Next, the switch unit 121 specifies, among the priority lists, the priority list which includes the broadcast station name of the currently-receiving channel as the name of the switching-source broadcast station. Next, the switch unit 121 specifies, among broadcast station names included in the detected channel information, the names of one or more broadcast stations whose reception level values are equal to or higher than a predetermined value. Next, among broadcast station names of switching-target-candidate channels included in the specified priority list, the switch unit 121 specifies, as the broadcast station name of the switching-target channel, the broadcast station name of a switching-target-candidate channel whose reception level value is equal to or higher than the predetermined value and whose priority is the highest.

For example, a case is considered where the currently-receiving channel information is as shown in FIG. 2, the detected channel information is as shown in FIG. 3, and the priority list is as shown in FIG. 4.

In this case, the switch unit 121 extracts a broadcast station name "AAA television" in the currently-receiving channel information. Next, the switch unit 121 specifies, among the priority lists, the priority list which includes the broadcast station name of the currently-receiving channel, "AAA television," as the name of the switching-source broadcast station. Next, the switch unit 121 specifies, among broadcast station names included in the detected channel information, the names of one or more broadcast stations whose reception level values are equal to or higher than the predetermined value (which are assumed to be "CCC television" and "television DDD" here). Next, among broadcast station names of switching-target-candidate channels included in the specified priority list, the switch unit 121 specifies, as the broadcast station name of the switching-target channel, the broadcast station name of a switching-target-candidate channel, "television DDD," whose reception level value is equal to or higher than the predetermined value and whose priority is the highest.

The switch unit 121 also performs control of switching the channel received by the first tuner 106 to the switching-target channel thus specified.

On the other hand, if the channel switching mode is the group mode, the switch unit 121 specifies a switching-target channel on the basis of the currently-receiving channel information, the detected channel information, and the corresponding group list.

To be more specific, the switch unit 121 extracts a broadcast station name in the currently-receiving channel information (i.e., the broadcast station name of the currently-receiving channel). Next, the switch unit 121 specifies, among the group lists, the group list which includes the broadcast station name of the currently-receiving channel as the name of the switching-source broadcast station. Next, the switch unit 121 specifies, among broadcast station names included in the detected channel information, the names of one or more broadcast stations whose reception level values are equal to or higher than a predetermined value. Next, among broadcast station names of switching-target-candidate channels included in the specified group list, the switch unit 121 specifies, as the broadcast station name of the switching-target channel, the broadcast station name of a channel whose reception level value is equal to or higher than the predetermined value and whose detected time is the latest.

For example, a case is considered where the currently-receiving channel information is as shown in FIG. 2, the detected channel information is as shown in FIG. 3, and the group list is as shown in FIG. 5.

In this case, the switch unit 121 extracts a broadcast station name "AAA television" in the currently-receiving channel information. Next, the switch unit 121 specifies, among the group lists, the group list which includes the broadcast station name of the currently-receiving channel, "AAA television," as the name of the switching-source broadcast station. Next, the switch unit 121 specifies, among broadcast station names included in the detected channel information, the names of one or more broadcast stations whose reception level values are equal to or higher than the predetermined value (which are assumed to be "CCC television" and "television DDD" here). Next, among broadcast station names of switching-target-candidate channels included in the specified group list, the switch unit 121 specifies, as the broadcast station name of the switching-target channel, the broadcast station name of a channel whose reception level value is equal to or higher than the predetermined value and whose detected time is the latest (which is assumed to be "television DDD" here).

The switch unit 121 also performs control of switching the channel received by the first tuner 106 to the switching-target channel thus specified.

(2) Operation of Digital Broadcast Receiver

Figure 6:
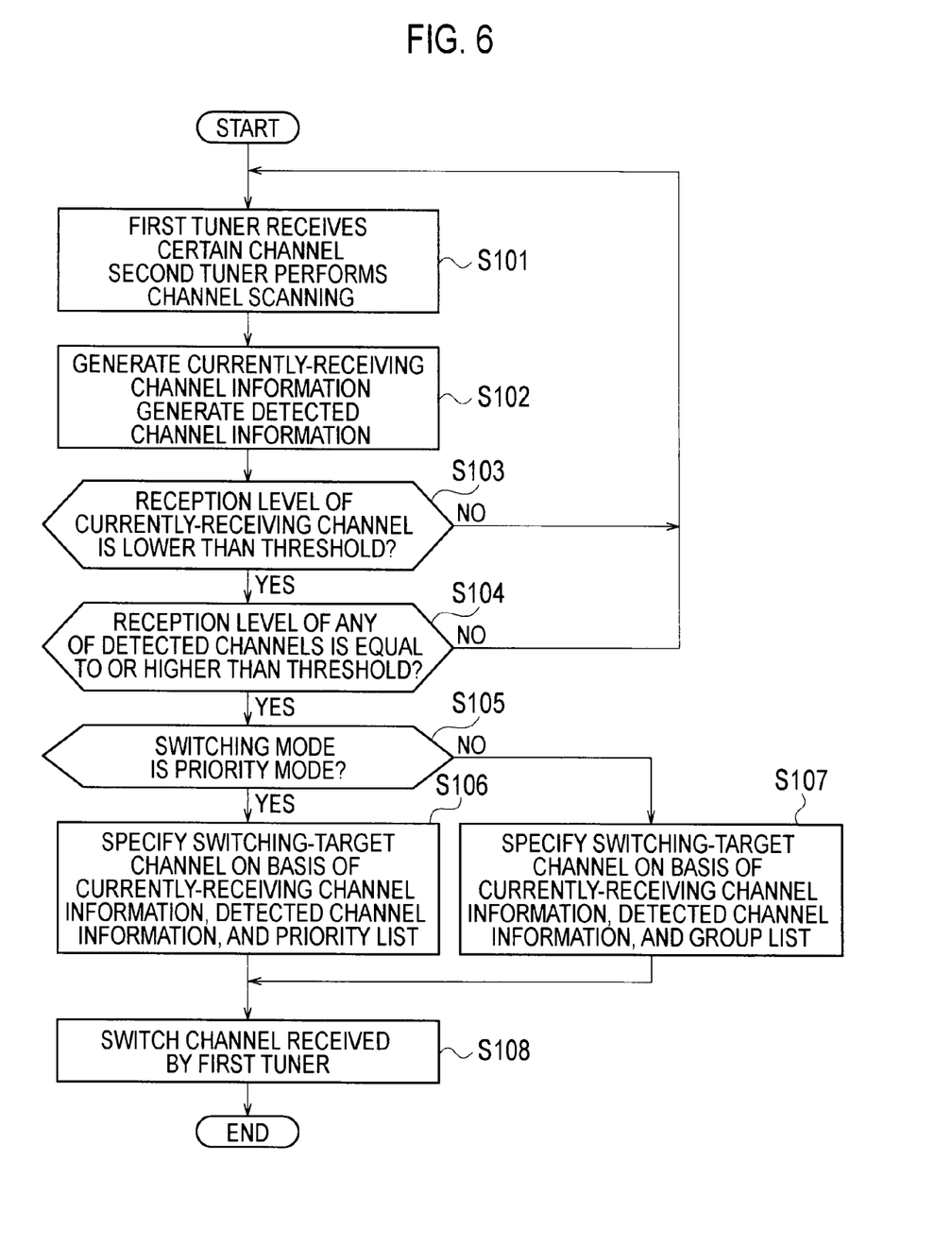
FIG. 6 is a flowchart illustrating an operation of the digital broadcast receiver according to the embodiment of the present invention.

FIG. 6 is a flowchart illustrating an operation of the digital broadcast receiver 10.

In step S101, the first tuner 106 receives digital broadcast on a certain channel. Meanwhile, the second tuner 107 performs channel scanning at a predetermined cycle in parallel with the reception of digital broadcast on the certain channel by the first tuner 106.

In step S102, the controller 102 generates currently-receiving channel information by associating, with one another, the reception level value, channel number, and broadcast station name of the channel currently received by the first tuner 106.

The controller 102 also generates detected channel information by associating, with one another, the reception level value, channel number, broadcast station name, and detected time of the channel detected through the channel scanning by the second tuner 107 (detected channel).

In step S103, the controller 102 judges whether or not the reception level value of the currently-receiving channel is lower than a threshold. If the reception level value of the currently-receiving channel is equal to or higher than the threshold, the reception of the digital broadcast on the certain channel by the first tuner 106 and the channel scanning by the second tuner 107 in step S101, continue.

On the other hand, if the reception level value of the currently-receiving channel is lower than the threshold, the controller 102 judges whether or not the reception level value of any of the detected channels is equal to or higher than the threshold in step S104. If the reception level values of all the detected channels are lower than the threshold, the reception of the digital broadcast on the certain channel by the first tuner 106 and the channel scanning by the second tuner 107 in step S101, continue.

On the other hand, if the reception level value of any of the detected channels is equal to or higher than the threshold, the controller 102 judges whether the channel switching mode is the priority mode in step S105.

If the channel switching mode is the priority mode, the controller 102 specifies a switching-target channel on the basis of the currently-receiving channel information, the detected channel information, and the corresponding priority list in step S106. In step S108, the controller 102 performs control of switching the channel received by the first tuner 106 to the switching-target channel thus specified.

Meanwhile, if the channel switching mode is not the priority mode in step S105, in other words, if the channel switching mode is the group mode, the controller 102 specifies a switching-target channel on the basis of the currently-receiving channel information, the detected channel information, and the corresponding group list in step S107. In step S108, the controller 102 also performs control of switching the channel received by the first tuner 106 to the switching-target channel thus specified.

(3) Operations and Effects

The digital broadcast receiver 10 according to this embodiment includes the first tuner 106 and the second tuner 107. The first tuner 106 receives a certain channel, whereas the second tuner 107 performs channel detection at a predetermined cycle. If the reception level of the certain channel currently received by the first tuner 106 becomes lower than a threshold, the digital broadcast receiver 10 switches the channel received by the first tuner 106 to a channel whose reception level is equal to or higher than the threshold among channels detected by the second tuner 107. Thus, the digital broadcast receiver 10 is capable of performing the reception of a certain channel and the channel detection in parallel by use of the first tuner 106 and the second tuner 107, and thereby restarting broadcast reception instantly when the digital broadcast receiver 10 moves and the area changes.

(4) Other Embodiments

The present invention has been described by the above-described embodiment. However, it should not be understood that the description and drawings constituting a part of the disclosure intend to limit the present invention. Various alternative embodiments, examples, and operational techniques will be apparent for those skilled in the art from the disclosure.

In the above embodiment, the switch unit 121 of the controller 102 performs control of specifying the switching-target channel and of switching the channel received by the first tuner 106 to the switching-target channel thus specified. Alternatively, the digital broadcast receiver 10 may be designed to present multiple switching-target-candidate channels to the user and to allow the user to select a switching-target channel.

In this case, the following processes are performed. Specifically, if the channel switching mode is the priority mode, the switch unit 121 of the controller 102 extracts a broadcast station name in the currently-receiving channel information (i.e., the broadcast station name of the currently-receiving channel). Next, the switch unit 121 specifies, among the priority lists, the priority list which includes the broadcast station name of the currently-receiving channel as the name of the switching-source broadcast station. Next, the switch unit 121 specifies, among broadcast station names included in the detected channel information, the names of one or more broadcast stations whose reception level values are equal to or higher than a predetermined value. Next, among broadcast station names of switching-target-candidate channels included in the specified priority list, the switch unit 121 specifies, as broadcast station names of switching-target-candidate channels, broadcast station names of one or more switching-target-candidate channels whose reception level values are equal to or higher than the predetermined value and which are of a predetermined priority or higher.

On the other hand, if the channel switching mode is the group mode, the switch unit 121 of the controller 102 extracts a broadcast station name in the currently-receiving channel information (i.e., the broadcast station name of the currently-receiving channel). Next, the switch unit 121 specifies, among the group lists, the group list which includes the broadcast station name of the currently-receiving channel as the name of the switching-source broadcast station. Next, the switch unit 121 specifies, among broadcast station names included in the detected channel information, the names of one or more broadcast stations whose reception level values are equal to or higher than a predetermined value. Next, among broadcast station names of switching-target-candidate channels included in the specified group list, the switch unit 121 specifies, as broadcast station names of switching-target-candidate channels, broadcast station names of one or more channels whose reception level values are equal to or higher than the predetermined value and whose detected time is the latest.

Figure 7:
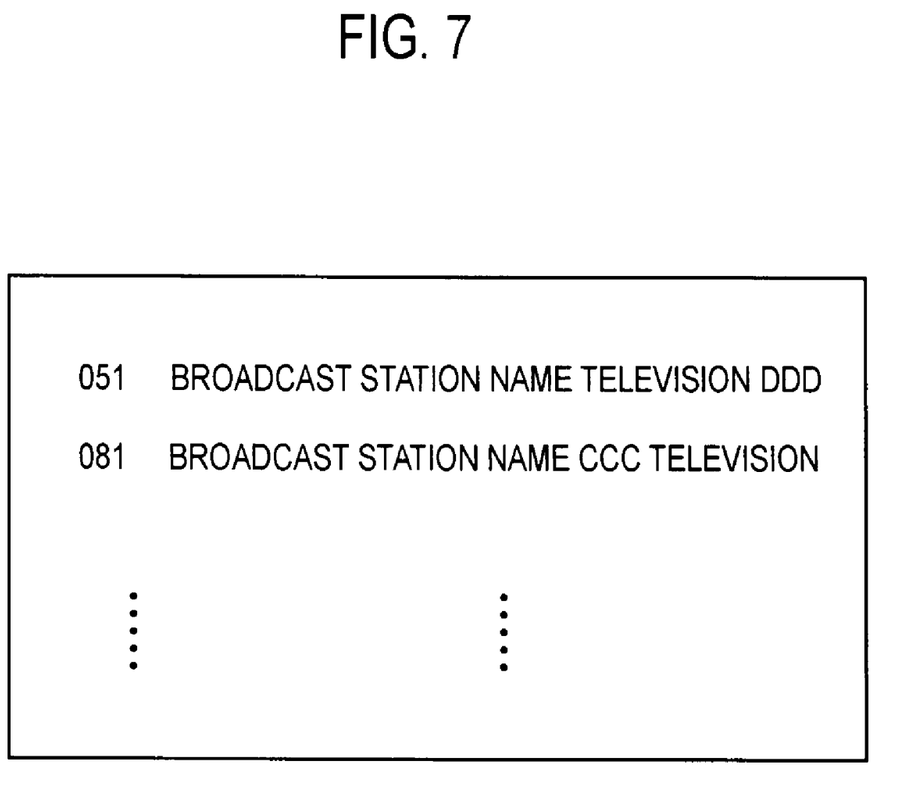
FIG. 7 is a diagram illustrating an example of displaying switching-target-candidates according to an embodiment of the present invention.

Further, in each of the channel switching modes, i.e., the priority mode and the group mode, the display controller 123 performs control of causing the monitor 117 to display thereon the broadcast station names of the switching-target-candidate channels thus specified. FIG. 7 is a diagram illustrating an example of displaying the broadcast station names of the switching-target-candidate channels.

The user operates the operation unit 118 to select one of the displayed broadcast station names of the switching-target-candidate channels as the switching target. Upon reception of an operation signal generated according to this operation from the operation unit 118, the switch unit 121 specifies a switching-target channel on the basis of the operation signal. The switch unit 121 also performs control of switching the channel received by the first tuner 106 to the switching-target channel thus specified.

As described above, it should be understood that the present invention includes various embodiments and the like not listed herein. Accordingly, the technical scope of the present invention is defined only by the specific subject matters of the invention according to the scope of the invention as defined by the appended claims deemed appropriate for this disclosure.

A threshold calculation method and a radio base station according to the present invention allow determining an appropriate MCS in accordance with communication quality while reducing a process amount in the radio base station, and are accordingly advantageous as the threshold calculation method and the radio base station.

What is claimed is:

1. A digital broadcast receiver configured to receive digital broadcast, comprising:
   a first tuner configured to receive a certain channel;
   a second tuner configured to perform channel detection; and
   a switch unit configured to switch a channel received by the first tuner to a channel which reception level is not lower than a threshold among channels detected by the second tuner, when a reception level of the certain channel being received by the first tuner becomes lower than the threshold; and
   a first storage configured to store a list of broadcast stations constituting a group, wherein
   the switch unit performs the channel switching on the basis of the list of broadcast stations constituting a group.

2. The digital broadcast receiver according to claim 1, wherein the second tuner performs the channel detection at a predetermined cycle.

3. The digital broadcast receiver according to claim 1, further comprising:
   a second storage configured to store, on the certain channel basis, a priority list of a switching-target-candidate channels, wherein
   the switch unit performs the channel switching on the basis of the priority list.

4. The digital broadcast receiver according to claim 1, further comprising:
   a presentation unit configured to present information on switching-target-candidate channels, wherein
   when any of the switching-target-candidate channels is selected, the switch unit switches the channel to the selected channel.

5. The digital broadcast receiver according to any one of claims 1 to 3 and 4, further comprising:
   a third storage configured to store detected channel information indicating the channels detected by the second tuner.

6. The digital broadcast receiver according to claim 5, further comprising:
   an update unit configured to update the detected channel information so that the third storage stores sets of detected channel information which are respectively obtained through the last predetermined times of the channel detection by the second tuner.

7. The digital broadcast receiver according to claim 6, wherein
   the detected channel information includes information on detected time at which the channels are each detected by the second tuner, and
   the switch unit forms the priority list so that a channel the detected time of which is newer has higher priority.

8. The digital broadcast receiver according to claim 5, wherein, when performing the channel switching on the basis of the priority list of a switching-target-candidate channels, the switch unit forms the priority list on the basis of the detected channel information held by the third storage, and performs the channel switching on the basis of the priority list thus formed.

9. The digital broadcast receiver according to claim 8, wherein the switch unit forms the priority list so that a channel having been more frequently detected by the second tuner has higher priority.

10. The digital broadcast receiver according to claim 5, wherein, when performing the channel switching on the basis of the list of broadcast stations constituting a group, the switch unit determines priority of channels of broadcast stations included in the list of broadcast stations constituting a group, and performs the channel switching on the basis of the priority thus determined.

11. The digital broadcast receiver according to claim 10, wherein
   the detected channel information includes reception levels of digital broadcast signals of the channels detected by the second tuner, and
   the switch unit determines the priority of channels so that a channel with the reception level not lower than a predetermined value has higher priority among the channels of the broadcast stations included in the list of broadcast stations constituting a group.

12. A method for receiving digital broadcast using a digital broadcast receiver which has a first tuner and a second tuner and is configured to receive digital broadcast, comprising:
   causing a storage to store a list of broadcast stations constituting a group;
   causing the first tuner to receive a certain channel;
   causing the second tuner to perform channel detection; and
   causing the digital broadcast receiver to switch a channel received by the first tuner to a channel whose reception level is not lower than a threshold among channels detected by the second tuner on the basis of the list of broadcast stations constituting a group, when a reception level of the certain channel received by the first tuner becomes lower than the threshold.

* * * * *